(12) United States Patent
Jung et al.

(10) Patent No.: US 10,930,941 B2
(45) Date of Patent: Feb. 23, 2021

(54) SEPARATOR, AND FUEL CELL STACK COMPRISING THE SAME

(71) Applicant: LG CHEM, LTD., Seoul (KR)

(72) Inventors: Hye Mi Jung, Daejeon (KR); Jae Choon Yang, Daejeon (KR); Kyung Mun Kang, Daejeon (KR); Sueng Hoon Han, Daejeon (KR)

(73) Assignee: LG CHEM, LTD., Seoul (KR)

( * ) Notice: Subject to any disclaimer, the term of this patent is extended or adjusted under 35 U.S.C. 154(b) by 118 days.

(21) Appl. No.: 16/320,156

(22) PCT Filed: Jul. 24, 2017

(86) PCT No.: PCT/KR2017/007937
§ 371 (c)(1),
(2) Date: Jan. 24, 2019

(87) PCT Pub. No.: WO2018/021773
PCT Pub. Date: Feb. 1, 2018

(65) Prior Publication Data
US 2019/0245219 A1    Aug. 8, 2019

(30) Foreign Application Priority Data

Jul. 25, 2016 (KR) .................. 10-2016-0093977

(51) Int. Cl.
| | | |
|---|---|---|
| *H01M 8/0254* | (2016.01) | |
| *H01M 8/0258* | (2016.01) | |
| *H01M 8/1018* | (2016.01) | |
| *H01M 8/1004* | (2016.01) | |
| *H01M 8/10* | (2016.01) | |
| *H01M 8/2457* | (2016.01) | |

(Continued)

(52) U.S. Cl.
CPC ....... *H01M 8/0254* (2013.01); *H01M 4/8807* (2013.01); *H01M 8/0256* (2013.01);
(Continued)

(58) Field of Classification Search
CPC .................................................. H01M 8/0254
See application file for complete search history.

(56) References Cited

U.S. PATENT DOCUMENTS

2013/0177827 A1    7/2013  Okabe et al.
2015/0236368 A1    8/2015  Hashimoto et al.
(Continued)

FOREIGN PATENT DOCUMENTS

| JP | 2012-074266 A | 4/2012 |
|---|---|---|
| JP | 2012-124019 A | 6/2012 |

(Continued)

OTHER PUBLICATIONS

European Search Report for Appl. No. 17834715.9 dated Jul. 8, 2019.
(Continued)

*Primary Examiner* — James Lee
(74) *Attorney, Agent, or Firm* — Birch, Stewart, Kolasch & Birch, LLP

(57) ABSTRACT

A separator and a fuel cell stack, the separator including a plurality of convex portions and a plurality of concave portions which are sequentially provided along a first direction, the convex portions having first openings on top surfaces at predetermined intervals along a second direction orthogonal to the first direction and the first openings of two adjacent convex portions are each provided so as not to be positioned coaxially based on a virtual first line parallel to the first direction.

11 Claims, 4 Drawing Sheets

(51) Int. Cl.
  *H01M 8/0256* (2016.01)
  *H01M 4/88* (2006.01)
  *H01M 8/023* (2016.01)
(52) U.S. Cl.
  CPC ........... *H01M 8/0258* (2013.01); *H01M 8/10* (2013.01); *H01M 8/1004* (2013.01); *H01M 8/1018* (2013.01); *H01M 8/2457* (2016.02); *H01M 8/023* (2013.01); *Y02E 60/50* (2013.01)

(56) References Cited

U.S. PATENT DOCUMENTS

2015/0333357 A1  11/2015  Hashimoto et al.
2015/0349354 A1  12/2015  Fukuyama et al.
2015/0364774 A1  12/2015  Jin et al.

FOREIGN PATENT DOCUMENTS

| | | |
|---|---|---|
| JP | 2014-167860 A | 9/2014 |
| KR | 10-1410479 B1 | 6/2014 |
| KR | 10-1567224 B1 | 11/2015 |
| WO | WO 2012/035585 A1 | 3/2012 |
| WO | WO 2014/103528 A1 | 7/2014 |
| WO | WO-2014132706 A1 * | 9/2014 ......... H01M 8/0254 |

OTHER PUBLICATIONS

International Search Report for PCT/KR2017/007937 (PCT/ISA/210) dated Oct. 25, 2017.

* cited by examiner

[Figure 1]
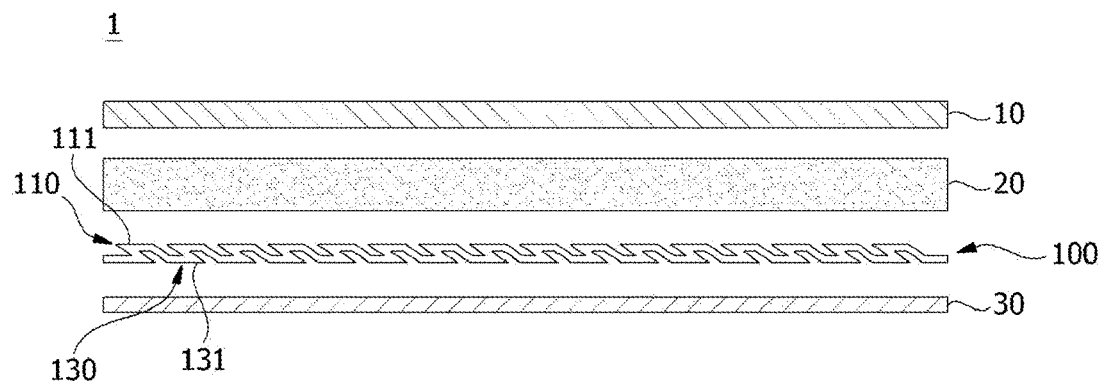
[Figure 2]
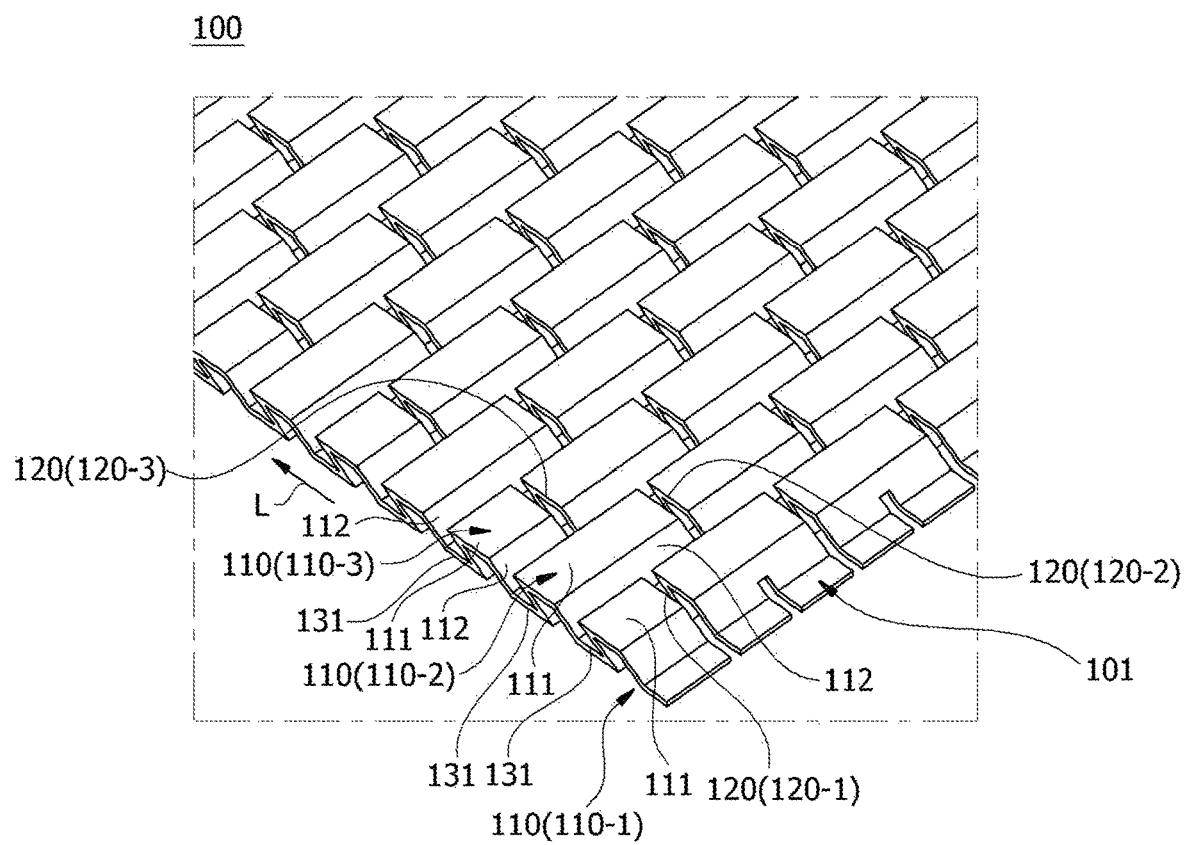

[Figure 3]
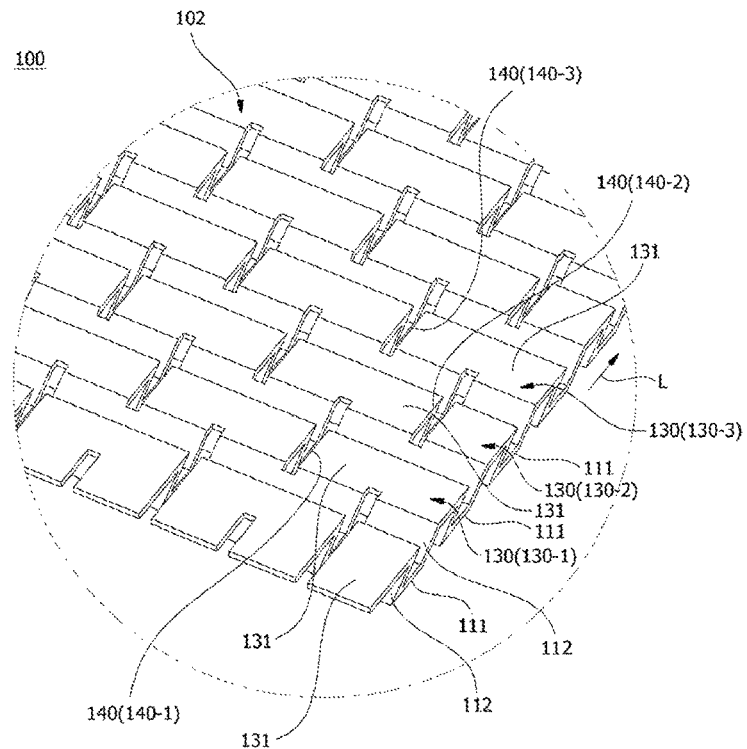
[Figure 4]
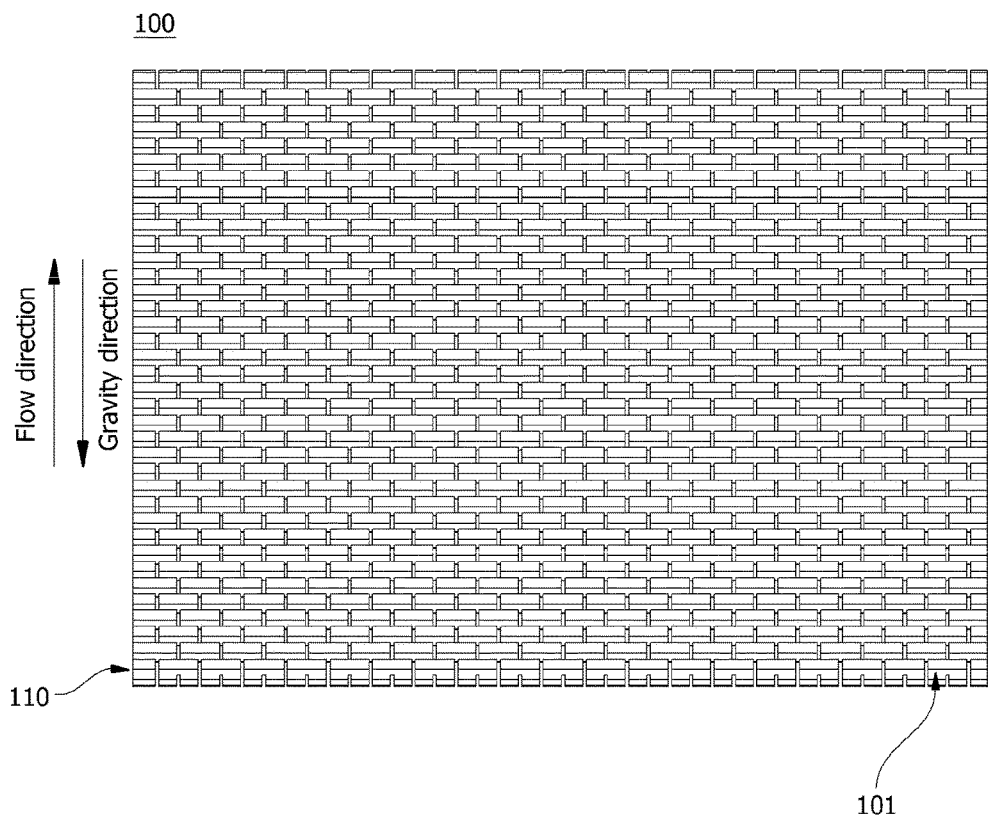

[Figure 5]
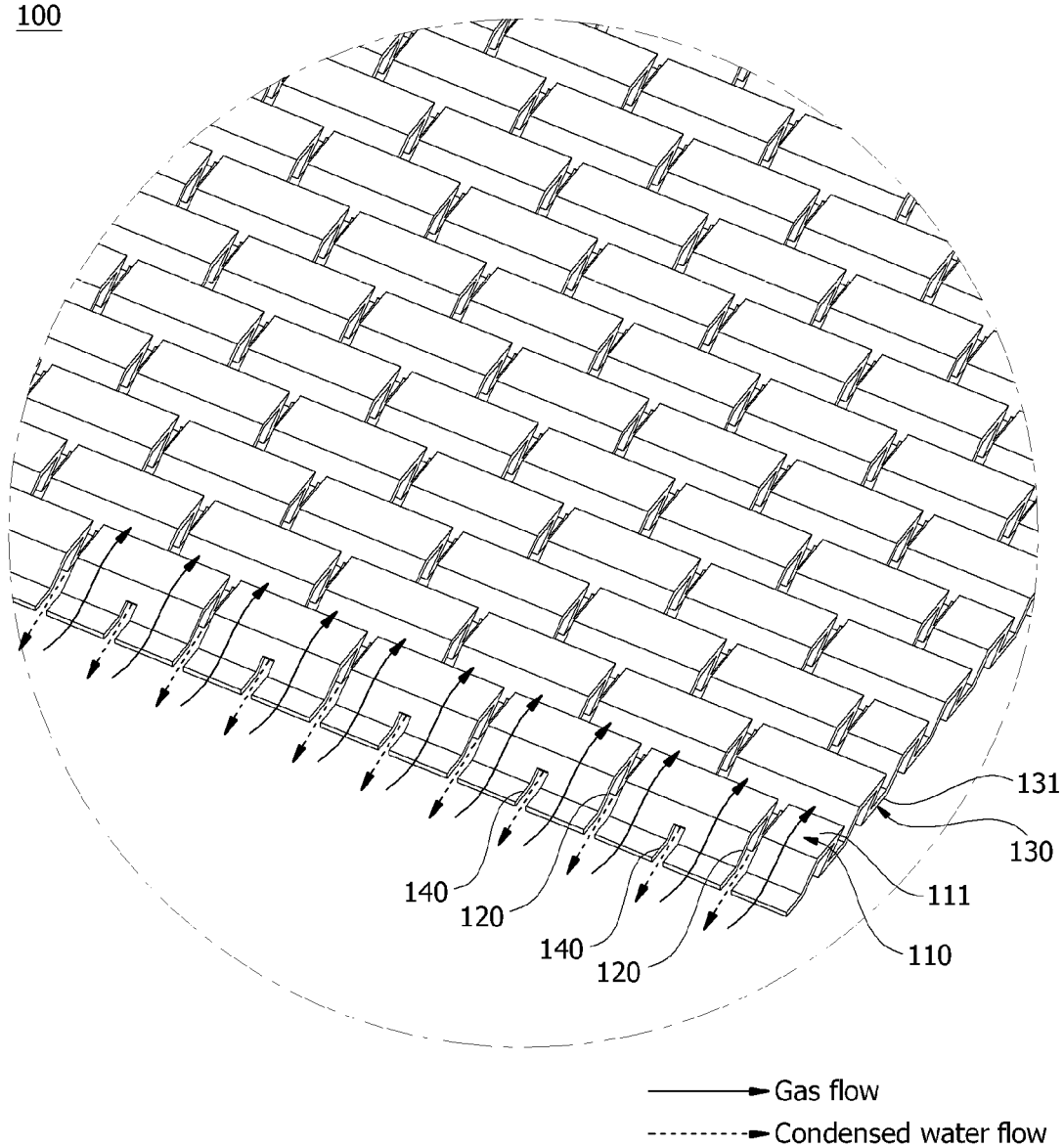

[Figure 6]
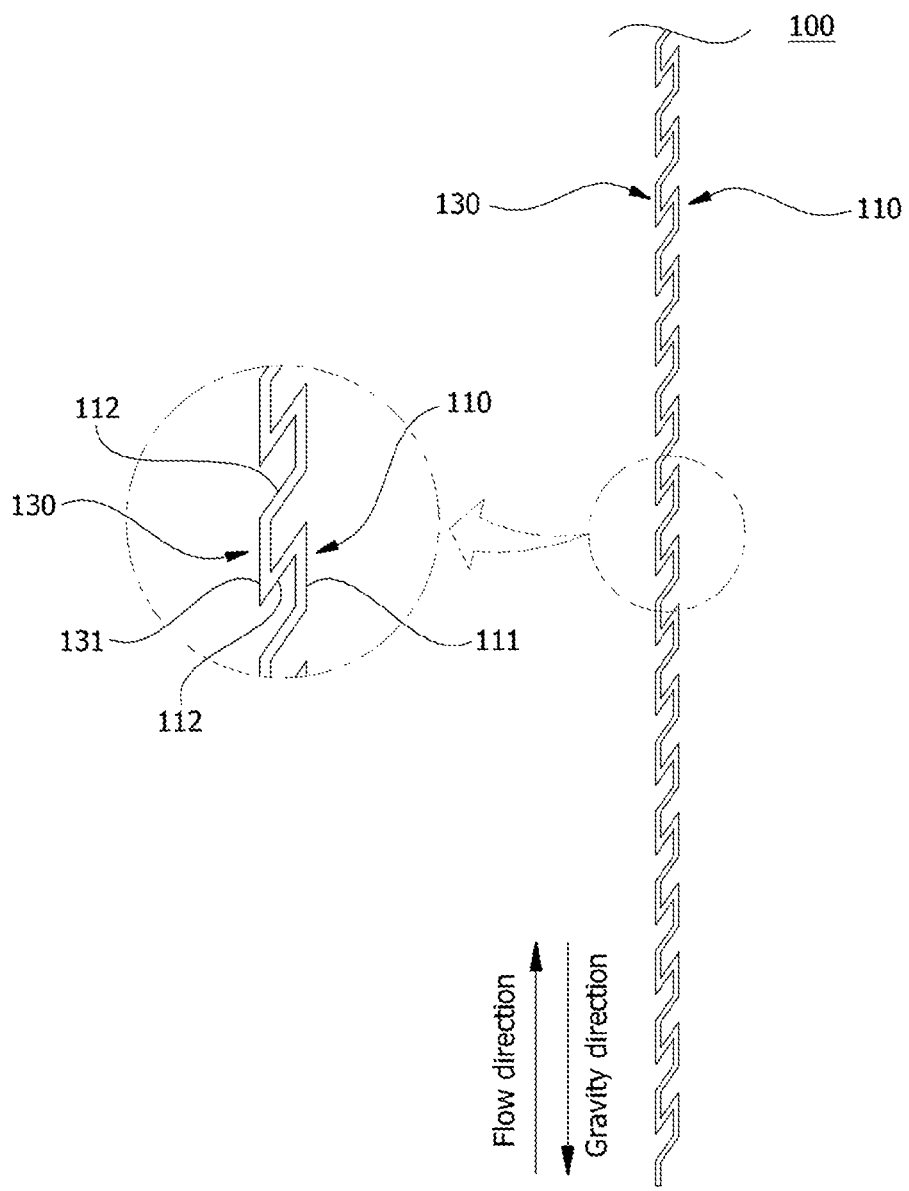

SEPARATOR, AND FUEL CELL STACK COMPRISING THE SAME

TECHNICAL FIELD

The present invention relates to a separator, and a fuel cell stack comprising the same.

This application claims priority from Korean Patent Application No. 10-2016-0093977 filed on Jul. 25, 2016, the disclosure which is incorporated herein by reference in its entirety.

BACKGROUND ART

Generally, a fuel cell is an energy conversion device that generates electrical energy through an electrochemical reaction between a fuel and an oxidizer and has an advantage that power can be consistently generated as long as the fuel is continuously supplied.

A polymer electrolyte membrane fuel cell (PEMFC) using a polymer membrane capable of permeating hydrogen ions as an electrolyte, has a low operating temperature of about 100° C. or lower as compared to other types of fuel cells, and has advantages of high energy conversion efficiency, high output density and fast response characteristics. Besides, since it can be miniaturized, it can be provided as portable, vehicle and household power supplies.

The polymer electrolyte fuel cell stack may comprise a membrane-electrode assembly (MEA) having an electrode layer formed by applying an anode and a cathode, respectively, around an electrolyte membrane composed of a polymer material, a gas diffusion layer (GDL) serving to distribute reaction gases evenly over reaction zones and to transfer electrons generated by oxidation reaction of the anode electrode toward the cathode electrode, a separating plate (bipolar plate) for supplying the reaction gases to the gas diffusion layer and discharging water generated by the electrochemical reaction to the outside, and a rubber material gasket having elasticity disposed on the outer circumference of the reaction zone of the separating plate or the membrane-electrode assembly to prevent leakage of the reaction gases and the cooling water.

Conventional separators for a fuel cell stack are configured such that the flows of the reaction gas and the resulting water travel in the same direction through two-dimensional channels or are distributed and discharged through intersecting three-dimensional solid shapes. However, they have a structure that is not suitable for efficiently discharging a variable amount of water under various operation conditions, thereby having a problem of deteriorating the performance of the fuel cell stack.

Particularly, there is a technical problem that a water transfer (supply/generation/discharge) imbalance in the fuel cell occurs in the high output region and a high mass transfer resistance (usually diffusion resistance) of the reaction gas in the reaction surface occurs.

In addition, in the case of conventional separating plates, for example, separating plates applied by metal mesh, expanded metal, etc., transfer passages of the reaction gas and the condensed water (generated water) are not distinguished clearly, thereby resulting in problems of reduction in the reaction gas supply efficiency and performance instability due to the condensed water occlusion in the microchannel.

DISCLOSURE

Technical Problem

It is a problem to be solved by the present invention to provide a separator capable of directly transferring a reaction gas into an electrode surface, and a fuel cell stack comprising the same.

Also, it is another problem to be solved by the present invention to provide a separator capable of improving a reaction gas transfer rate and a water discharge performance, and a fuel cell stack comprising the same.

Furthermore, it is another problem to be solved by the present invention to provide a separator capable of sufficiently securing a contact area in contact with a gas diffusion layer and simultaneously reducing a contact resistance, and a fuel cell stack comprising the same.

In addition, it is another problem to be solved by the present invention to provide a separator capable of improving heat and mass transfer characteristics by a convection/diffusion mixed flow and a fuel cell stack comprising the same.

Also, it is another problem to be solved by the present invention to provide a separator capable of effectively discharging condensed water and a fuel cell stack comprising the same.

Furthermore, it is another problem to be solved by the present invention to provide a separator capable of improving reaction gas supply efficiency through efficient moisture management and preventing performance instability, and a fuel cell stack comprising the same.

Technical Solution

To solve the above-described problems, according to one aspect of the present invention, there is provided a separator comprising a plurality of convex portions and a plurality of concave portions which are sequentially provided along a first direction, wherein first openings are each provided on a top surface of the respective convex portion, the first openings are provided at predetermined intervals along a second direction orthogonal to the first direction and the first openings of two adjacent convex portions are each provided so as not to be positioned coaxially based on a virtual first line parallel to the first direction.

At this time, each first opening is formed to have a length along the first direction larger than a width along the second direction.

Also, each first opening is formed over the respective top surface and a partial area of a partition of the respective convex portion.

According to another aspect of the present invention, there is provided a separator comprising a plurality of convex portions and a plurality of concave portions which are sequentially provided along a first direction, wherein in the convex portions, first openings are each provided on a top surface of the respective convex portion, the first openings are provided at predetermined intervals along a second direction orthogonal to the first direction, at least one convex portion comprises a partition connected to an adjacent concave portion and a top surface connected to the partition, at least one concave portion comprises a partition connected to an adjacent convex portion and a bottom surface connected to the partition, the top surface and the bottom surface are each provided to be inclined at a predetermined angle with respect to the partitions of the at least one convex portion and the at least one concave portion, and the first openings of two adjacent convex portions are each provided so as not to be positioned coaxially based on a virtual first line parallel to the first direction.

According to another aspect of the present invention, there is also provided a fuel cell stack comprising a membrane-electrode assembly, a gas diffusion layer provided on one side of the membrane-electrode assembly and a separator disposed so that at least some regions of the separator are in contact with the gas diffusion layer. Here, the separator comprises a plurality of convex portions in contact with the gas diffusion layer and a plurality of concave portions which are not in contact with the gas diffusion layer, wherein the convex portions and the concave portions are successively provided along a first direction in sequence, and in the convex portions, first openings are each provided on a respective top surface a respective convex portion, the first opening are provided at predetermined intervals along a second direction orthogonal to the first direction and the first openings of two adjacent convex portions are each provided so as not to be positioned coaxially based on a virtual first line parallel to the first direction.

Advantageous Effects

As described above, the separator related to one embodiment of the present invention and the fuel cell stack comprising the same have the following effects.

The separator related to one embodiment of the present invention comprises a basic unit having a sloped surface inclined at a certain angle with respect to the electrode surface and a flat top surface, and has a shape in which basic units are cross-repeatedly aligned along a predetermined direction. At this time, the reaction gas can be directly transferred into the electrode surface through the first openings provided in the separator.

Also, by inducing the convection/diffusion mixed flow of the reaction gas through the cross-aligned structure, heat and mass transfer characteristics can be improved.

Furthermore, it is possible to sufficiently secure the contact area in contact with the gas diffusion layer and reduce the contact resistance (ohmic voltage loss reduction) simultaneously.

In addition, a gas flow (reaction gas) and a liquid (e.g., water) flow in the separator can be efficiently distributed through the first openings and the second openings, and the gas flow and the liquid (e.g., water) flow can be optimized. It is also possible to prevent the condensed water from accumulating in the separator. Specifically, the basic unit is inclined in the main flow direction of the reaction gas and a condensed water discharge flow path is formed, and thus the condensed water discharge is efficiently performed.

BRIEF DESCRIPTION OF DRAWINGS

FIG. 1 is a cross-sectional view of a fuel cell stack related to one embodiment of the present invention.

FIG. 2 is a perspective view of a separator related to one embodiment of the present invention.

FIG. 3 is a bottom perspective view of a separator related to one embodiment of the present invention.

FIG. 4 is a plan view of a separator related to one embodiment of the present invention.

FIG. 5 is a perspective view for explaining flows of gas and condensed water in a separator constituting a fuel cell stack.

FIG. 6 is a side view of a separator related to one embodiment of the present invention.

MODE FOR INVENTION

Hereinafter, a separator according to one embodiment of the present invention and a fuel cell stack comprising the same will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIG. 1 is a cross-sectional view of a fuel cell stack (1) related to one embodiment of the present invention, FIG. 2 is a perspective view of a separator (100) related to one embodiment of the present invention, and FIG. 3 is a bottom perspective view of a separator (100) related to the present invention.

FIG. 4 is a plan view of a separator (100) related to one embodiment of the present invention, FIG. 5 is a perspective view for explaining flows of a reaction gas and condensed water in a separator (100) constituting a fuel cell stack (1), and FIG. 6 is a side view of a separator (100) related to one embodiment of the present invention.

The fuel cell stack (1) related to one embodiment of the present invention comprises a membrane-electrode assembly (10), a gas diffusion layer (20) provided on one side of the membrane-electrode assembly (10) and a separator (100). Furthermore, the separator (100) is disposed so that the gas diffusion layer (20) contacts in at least some regions. Also, the fuel cell stack (1) comprises a bottom plate (30) disposed in a direction opposite to the gas diffusion layer (20) based on the separator (100).

Referring to FIGS. 1 and 2, the separator (100) comprises a plurality of convex portions (110) which are in contact with the gas diffusion layer (20) and a plurality of concave portions (130) which are not in contact with the gas diffusion layer (20). Furthermore, the convex portions and the concave portions are successively formed along the first direction (L) in sequence. For example, along the first direction (L), a first convex portion (110-1), a first concave portion (130-1), a second convex portion (110-2), a second concave portion (130-2), a third convex portion (110-3) and a fourth concave portion (130-3) may be successively provided in sequence. For example, side sections (see FIGS. 1 and 6) of the convex portion and the concave portion may have a substantially Korean alphabet "ㄷ" shape in opposite directions to each other.

The separator (100) may be a wave type plate having a first surface (101) and a second surface (102) opposite to the first surface (101). At this time, the convex portion (110) may have a structure protruding toward the first surface (101), and the concave portion (130) may have a shape depressed toward the second surface (102). Also, the first surface (101) is disposed to be in contact with the gas diffusion layer (20) in at least some areas and the second surface (102) is disposed to be in contact with a bottom plate (30) in at least some areas. That is, the separator (100) is disposed between the gas diffusion layer (20) and the bottom plate (30). At this time, a boundary region between the first surface (101) of the separator (100) and the gas diffusion layer (20) is provided to perform a passage function of the reaction gas, and a boundary region between the second surface (102) of the separator (100) and the bottom plate

(30) is provided to perform a discharge passage function of the condensed water (generated water).

Referring to FIGS. 1, 2 and 3, the separator (100) comprises a plurality of convex portions (110: 110-1, 110-2, 110-3) and a plurality of concave portions (130: 130-1, 130-2, 130-3), which are provided along the first direction (L) in sequence. At this time, the plurality of convex portions (110: 110-1, 110-2, 110-3) may be disposed to be in contact with the gas diffusion layer (20) in at least some areas (for example, top surface), and the plurality of concave portions (130: 130-1, 130-2, 130-3) may be disposed to be in contact with the bottom plate (30) in at least some areas (for example, bottom surface).

Referring to FIG. 2, in the convex portions (110: 110-1, 110-2, 110-3), the first openings (120: 120-1, 120-2, 102-3) are provided on the top surface (111) at predetermined intervals along a second direction orthogonal to the first direction (L). The first openings (120-1, 120-2) of two adjacent convex portions (110-1, 110-2) are each provided so as not to be positioned coaxially based on a virtual first line parallel to the first direction (L).

Also, at least one convex portion (110) comprises a partition (112) connected to the adjacent concave portion (130) and a top surface (111) connected to the partition (112). For example, at least one convex portion (110) may comprise a pair of partitions (112) connected to the concave portions (130) adjacent on both sides, respectively and a top surface (111) connecting the pair of partitions (112). For example, the pair of partitions (112) and the top surface (111) are connected to form a substantially Korean alphabet "ㄴ" shape. At this time, the top surface (111) of the convex portion (110) is formed as a flat surface rather than a curved surface. Furthermore, the separator (100) is disposed so that the top surface (111) is in contact with the gas diffusion layer (20). In addition, boundary edges of the partition (112) and the top surface (111) may be rounded.

Besides, the first opening (120) may be formed to have a length along the first direction (L) larger than a width along the second direction. The first opening (120) may have the same shape as a slit. Also, the top surface (111) of the convex portion (110) is provided so that the first opening (120) does not contact the gas diffusion layer (20). That is, the top surface (111) of the convex portion (110) is in contact with the gas diffusion layer (20) in the other areas except for the first opening (120). Therefore, the contact area with the gas diffusion layer (20) can be adjusted by adjusting the number, spacing, size, etc. of the first opening (120). As such, performance loss due to contact resistance can be prevented through the contact structure as above, and for example, a contact area of about 50% or more of the reaction zone can be ensured.

In addition, the first opening (120) may be formed over the top surface (111) and a partial area of the partition (112). The first opening (120) may also be formed over the top surface (111) and each partial area of a pair of partitions (112) connected to the top surface (111). Also, the first opening portion (120) may be formed over the top surface (111), and each partial area of a pair of partitions (112) connected to the top surface (111) and a partial area of the bottom surface (131) of the adjacent concave portion (130).

Furthermore, two first openings (120-1, 120-3), which are not adjacent to each other, of the first openings (120-1, 120-2, 120-3) in three adjacent convex portions (110-1, 110-2, 110-3) may be provided so as to be positioned coaxially based on a virtual first line parallel to the first direction (L). For example, when the first convex portion (110-1), the second convex portion (110-2) and the third convex portion (110-3) are arranged along the first direction (L) in sequence, the first openings (120-1, 120-2) of the first convex portion (110-1) and the second convex portion (110-2), two of which are adjacent to each other, may be each provided so as not to be positioned coaxially based on a virtual first line parallel to the first direction (L) and the first openings (120-2, 120-3) of the second convex portion (110-2) and the third convex portion (110-3), two of which are adjacent to each other, may be each provided so as not to be positioned coaxially based on a virtual first line parallel to the first direction (L). Alternatively, based on the first opening of any one convex portion (for example, second convex portion), the first openings of the convex portions (for example, first and third convex portions), which are each positioned on both sides of the convex portion, may be provided so as to be positioned coaxially based on a virtual first line parallel to the first direction (L). That is, based on any one convex portion, convex portions on both sides may have a symmetrical shape.

On the other hand, referring to FIG. 3, in the concave portions (130: 130-1, 130-2, 130-3), the second openings (140: 140-1, 140-2, 140-3) are each provided on the bottom surfaces (131) at predetermined intervals along the second direction orthogonal to the first direction (L). Also, the second openings (140-1, 140-2) of two adjacent concave portions (130-1, 130-2) are each provided so as not to be positioned coaxially based on a virtual first line parallel to the first direction (L).

Furthermore, at least one concave portion (130) comprises a partition (112) connected to the adjacent convex portion (110) and a bottom surface (131) connected to the partition (112). For example, at least one concave portion (130) may comprise a pair of partitions (112) connected to the convex portions (110) adjacent on both sides, respectively and a bottom surface (131) connecting the pair of partitions (112). For example, the pair of partitions (112) and the bottom surface (131) are connected to form a substantially Korean alphabet "ㄴ" shape. At this time, the bottom surface (131) of the concave portion (130) may be formed as a flat surface rather than a curved surface. Also, the separator (100) is disposed so that the bottom surface (131) is in contact with the bottom plate (30). In addition, the boundary edges of the partition (112) and the bottom surface (131) may also be rounded.

Besides, the second opening (140) may be formed to have a length along the first direction (L) larger than a width along the second direction. The second opening (140) may have the same shape as a slit.

Also, the second opening (140) may be formed over the bottom surface (131) and a partial area of the partition (112). Furthermore, the second opening (140) may be formed over the bottom surface (111) and each partial area of the pair of partitions (112) connected to the bottom surface (131). In addition, the second opening (120) may be formed over the bottom surface (131), and each partial area of the pair of partitions (112) connected to the bottom surface (131) and a partial area of the top surface (111) of the adjacent convex portion (110).

Furthermore, two second openings (140-1, 140-3), which are not adjacent to each other, of the second openings (140-1, 140-2, 140-3) in three adjacent concave portions (130-1, 130-2, 130-3) may be provided so as to be positioned coaxially based on a virtual first line parallel to the first direction (L). For example, when the first concave portion (130-1), the second concave portion (130-2) and the third concave portion (130-3) are arranged along the first direction (L) in sequence, the second openings (140-1, 140-2) of the first concave portion (130-1) and the second concave portion (130-2), two of which are adjacent to each other, may also be provided so as not to be positioned coaxially based on a virtual first line parallel to the first direction (L) and the second openings (140-2, 140-3) of the second concave portion (130-2) and the third concave portion (130-3), two of which are adjacent to each other, may also be provided so as not to be positioned coaxially based on a virtual first line parallel to the first direction (L). Alternatively, based on the second opening of any one concave portion (for example, second convex portion), the second openings of the concave portions (for example, first and third concave portions), which are positioned on both sides of the concave portion, may be provided so as to be positioned coaxially based on a virtual first line parallel to the first direction (L). That is, based on any one concave portion, concave portions on both sides may have a symmetrical shape.

In addition, the first opening (120) and the second opening (140) of the convex portion (110) and the concave portion (130), which are adjacent to each other, may also be provided so as not to be positioned coaxially based on to a virtual first line parallel to the first direction (L).

In summary, two adjacent first openings (120) may be alternately arranged in a zigzag shape and two adjacent second openings (140) may be alternately in a zigzag shape, along the first direction.

Furthermore, the partition (112) may be inclined at a predetermined angle with respect to the bottom surface (131) and the partition (112) may be inclined at a predetermined angle with respect to the top surface (111). Also, the bottom surface (131) of the concave portion (130) and the top surface (111) of the convex portion (110) may be provided in parallel. For example, the convex portions (130) may be provided to be inclined toward the first direction (L).

Referring to FIGS. 4 and 5, it may be provided such that a reaction gas (oxidation gas) is supplied to the separator (100) along the first direction (L). The first direction (L) herein may mean a flow direction of the reaction gas (main flow direction). Also, the separator (100) may be disposed so that the opposite direction to the first direction (L) is a gravity direction. Through such a configuration structure, the flow direction of the condensed water (generated water) can be determined to be the gravity direction which is the opposite direction of the first direction (L).

Referring to FIGS. 5 and 6, the condensed water flows down on the separator (100) by gravitational force. Particularly, the condensed water flows along the boundary region between the bottom plate (30) and the bottom surface (131) of the concave portion (130), and flows through the second opening portion (140). At this time, as the second openings (140) are crossed and arranged in a zigzag shape along the gravity direction, in a process that the condensed water flows along the gravity direction, the condensed water passing through any one of the second openings (140) collides with the partition (112) and performs a series of processes such as branching into the second openings (140) on both sides, or joining again. In addition, as the partition (112) is formed as an inclined surface inclined with respect to the bottom surface (131), it may have a structure in which the condensed water is temporarily collected at the lower end of the inclined surface, and then the flow is performed again, as in FIG. 6.

Also, the flow of the reaction gas may be formed along the partition (112) to the direction of the gas diffusion layer (20), and at this time, as the partition (112) is formed as an inclined surface, a slow upward flow can be made toward the gas diffusion layer (20). In addition, in the process of passing the flow through the first openings (120) and forming the flow along the first direction (L) continuously, the mixed flow form of convection/diffusion may be made due to the zigzag arrangement of the first openings (120).

The preferred embodiments of the present invention as described above are disclosed for illustrative purposes, which can be modified, changed and added within thought and scope of the present invention by those skilled in the art and it will be considered that such modification, change and addition fall within the following claims.

INDUSTRIAL APPLICABILITY

According to the present invention, a gas flow (reaction gas) and a liquid (e.g., water) flow in the separator can be efficiently distributed through the first openings and the second openings, and the gas flow and the liquid (e.g., water) flow can be optimized.

The invention claimed is:

1. A separator comprising:
a plurality of convex portions and a plurality of concave portions which are sequentially provided along a first direction; and
a plurality of partitions connecting each convex portion with an adjacent one of the concave portions,
wherein first openings are each provided on a top surface of the respective convex portion, the first openings are provided at predetermined intervals along a second direction orthogonal to the first direction,
wherein the first openings of two adjacent convex portions along the first direction are each provided so as not to be positioned coaxially based on a virtual first line parallel to the first direction,
wherein each first opening is formed to have a length along the first direction larger than a width along the second direction,
wherein each first opening is formed over the respective top surface and a partial area of the partition of the respective convex portion,
wherein the separator further comprises second openings extending only from a bottom surface of the respective concave portion into an intermediate portion of the respective partition, and
wherein the second openings of two adjacent concave portions along the first direction are each provided so as not to be positioned coaxially based on the virtual first line parallel to the first direction.

2. The separator according to claim 1,
wherein each top surface is formed as a flat surface.

3. The separator according to claim 1,
wherein the bottom surface of each concave portion is formed as a flat surface.

4. The separator according to claim 1,
wherein each second opening is formed to have a length along the first direction larger than a width along the second direction.

5. The separator according to claim 1,
wherein two second openings of the second openings in three adjacent concave portions are provided to be positioned coaxially based on the virtual first line parallel to the first direction.

6. The separator according to claim 3,
wherein each partition is inclined at a predetermined angle with respect to the bottom surface of the respective concave portion and the top surface of the respective concave portion.

7. The separator according to claim 6,
wherein each bottom surface is parallel to each top surface.

8. A separator comprising:
a plurality of convex portions and a plurality of concave portions which are sequentially provided along a first direction,
wherein first openings are each provided on a top surface of the respective convex portion, the first openings are provided at predetermined intervals along a second direction orthogonal to the first direction,
at least one convex portion comprises a partition connected to an adjacent concave portion and a top surface connected to the partition,
at least one concave portion comprises a partition connected to an adjacent convex portion and a bottom surface connected to the partition,
the top surface and the bottom surface are each inclined at a predetermined angle with respect to the partitions,
the first openings of two adjacent convex portions are each provided so as not to be positioned coaxially based on a virtual first line parallel to the first direction,
each first opening is formed to have a length along the first direction larger than a width along the second direction, and
the respective first opening is formed over the top surface of the at least one convex portion and a partial area of the partition of the at least one convex portion,
wherein the separator further comprises at least one second opening extending only from a bottom surface of the respective concave portion into an intermediate portion the respective partition, and
wherein the second openings of two adjacent concave portions along the first direction are each provided so as not to be positioned coaxially based on the virtual first line parallel to the first direction.

9. A fuel cell stack, comprising:
a membrane-electrode assembly;
a gas diffusion layer provided on one side of the membrane-electrode assembly; and
a separator disposed so that at least some regions of the separator are in contact with the gas diffusion layer,
wherein the separator comprises a plurality of convex portions in contact with the gas diffusion layer and a plurality of concave portions which are not in contact with the gas diffusion layer,
wherein the convex portions and the concave portions are successively provided along a first direction in sequence,
wherein first openings are each provided on a respective top surface of a respective convex portion, the first openings are provided at predetermined intervals along a second direction orthogonal to the first direction,
wherein the first openings of two adjacent convex portions are each provided so as not to be positioned coaxially based on a virtual first line parallel to the first direction,
wherein each first opening is formed to have a length along the first direction larger than a width along the second direction,
wherein each first opening is formed over the respective top surface of the respective convex portion and a partial area of a respective partition of the convex portion,
wherein the separator further comprises:
a plurality of partitions connecting each convex portion with each adjacent concave portion; and
second openings extending only from a bottom surface of the respective concave portion into an intermediate portion the respective partition, and
wherein the second openings of two adjacent concave portions along the first direction are each provided so as not to be positioned coaxially based on the virtual first line parallel to the first direction.

10. The fuel cell stack according to claim 9,
wherein the fuel cell stack is provided so that a reaction gas is supplied to the separator along the first direction.

11. The fuel cell stack according to claim 9,
wherein the fuel cell stack is provided so that the convex portions are inclined toward the first direction.

* * * * *